United States Patent [19]

Sugiyama et al.

[11] 4,223,565
[45] Sep. 23, 1980

[54] DEVICE FOR ATTENUATING VIBRATIONS IN A DRIVE SHAFT OF A MOTOR VEHICLE

[75] Inventors: Tomoyuki Sugiyama, Niiza; Shigeru Machida, Kawagoe; Akihiro Kubo, Kuki; Junichi Araki, Asaka; Nobuyuki Nakamura, Kawagoe, all of Japan

[73] Assignee: Honda Giken Kogyo Kabushiki Kaisha, Tokyo, Japan

[21] Appl. No.: 859,032

[22] Filed: Dec. 9, 1977

[30] Foreign Application Priority Data

Dec. 11, 1976 [JP] Japan .......................... 51-166343[U]
Aug. 15, 1977 [JP] Japan .......................... 52-108931[U]

[51] Int. Cl.² ............................................. F16F 5/10
[52] U.S. Cl. ................................................. 74/574
[58] Field of Search ........................... 74/574; 64/1 V

[56] References Cited

U.S. PATENT DOCUMENTS

| 1,925,072 | 8/1933 | Griswold | 74/574 |
|---|---|---|---|
| 1,934,191 | 11/1933 | Hoffman | 74/574 |
| 2,001,165 | 5/1935 | Swennes | 64/1 V |
| 2,039,378 | 5/1936 | Anderson, Jr. | 74/574 X |
| 2,878,689 | 3/1959 | Aebersold | 74/574 |
| 3,485,063 | 12/1969 | Behlmer | 74/574 |
| 3,714,831 | 2/1973 | Quichaud et al. | 248/358 R X |
| 3,833,086 | 9/1974 | Giraudeau | 248/358 R X |
| 3,887,024 | 6/1975 | Takahashi et al. | 64/1 V X |
| 4,121,813 | 10/1978 | Inuzuka | 248/358 R X |

FOREIGN PATENT DOCUMENTS

| 1462170 | 1/1977 | United Kingdom | 64/1 V |
|---|---|---|---|
| 453508 | 1/1975 | U.S.S.R. | 64/1 V |

Primary Examiner—Samuel Scott
Assistant Examiner—Wesley S. Ratliff, Jr.
Attorney, Agent, or Firm—Polster, Polster and Lucchesi

[57] ABSTRACT

Proposed in this application is a device for attenuating vibrations in a drive shaft of a motor vehicle of a type, in which driving force of an engine is transmitted to both left and right drive shafts through a clutch, a transmission mechanism, and differential gears. This vibration attenuating device is constructed with a vibration absorbing device having a resilient member and a weight combined together as an integral whole, and both members are provided at one of the drive shafts having a length longer than the other to the end part thereof where wheel is to be fitted.

13 Claims, 6 Drawing Figures

DEVICE FOR ATTENUATING VIBRATIONS IN A DRIVE SHAFT OF A MOTOR VEHICLE

BACKGROUND OF THE INVENTION

This invention relates to a drive shaft of a motor vehicle, and, more particularly, it is concerned with a device for attenuating vibrations in the drive shaft of a vehicle especially for a front-engine-front-drive system, or a rear-engine-rear-drive system.

These types of motor vehicles are of such construction that the driving force of the engine is transmitted to the left and right drive shafts through the clutch, the transmission mechanism, and the differential gears to thereby drive the wheels. In such construction, vibrations generated from the engine, vibrations due to torque variations, and vibrations taken place by other causes tend to propagate to the drive shaft more easily than in the motor vehicle of a type, wherein a propeller shaft is employed as in a front-engine-rear-drive system which is commonly adopted in motor vehicles in general. As the result of such propagation of the vibrations, the drive shaft becomes resonant in some occasion.

When the resonance of the above-mentioned drive shaft occurs within a range of practical numbers of revolution of the engine, the vibrations caused thereby propagate to the vehicle body from the knuckle arm through the shock absorbers, springs, and other component parts to produce sound of resonance within the vehicle cabin to give disagreeable feeling to a vehicle driver and occupants.

SUMMARY OF THE INVENTION

In view of such disadvantages inherent in the above-described type of the motor vehicle, it is the primary object of the present invention to provide a device for attenuating vibrations in the drive shaft of a motor vehicle of a simple construction and being capable of eliminating the above-described inconveniences.

According to the present invention, generally speaking, there is provided, in a motor vehicle of a type, in which driving force of an engine is transmitted to both left and right drive shafts through a clutch, a transmission mechanism, and differential gears, a vibration attenuating device for the drive shaft which comprises vibration abosrbing means having a resilient member and a weight integrally combined therewith, both members being provided at, at least, one of said drive shafts to the end part thereof where wheel is to be fitted.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE ACCOMPANYING DRAWING

Specific embodiments of the present invention have been chosen for the purposes of illustration and description, and are shown in the accompanying drawings, forming a part of the specification, in which.

DETAILED DESCRIPTION OF PREFERRED EMBODIMENT

In the following, a preferred embodiment of the present invention will be described in detail in reference to the accompanying drawing.

Figure 1:
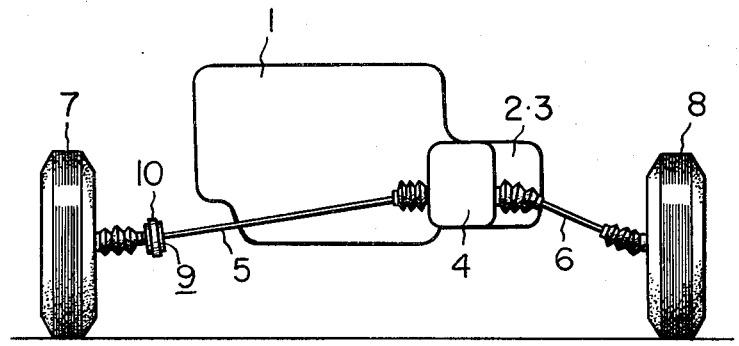
FIG. 1 is a schematic front view of a vehicle driving system provided with vibration absorbing means.

FIG. 1 shows a construction, in which an engine 1 is mounted perpendicularly in the longitudinal direction of a vehicle. In this case, driving force of the engine 1 is transmitted to left and right drive shafts 5 and 6 through a clutch 2, a transmission mechanism 3, and differential gears 4 to drive left and right wheels 7 and 8. It should be noted that, for the sake of convenience in understanding of the construction, detailed construction of the vehicle including knuckle arms, shock absorbers, and so on are omitted from the illustration.

The main point of the present invention resides in that a vibration absorbing device is provided on the drive shaft 5 which is longer than the drive shaft 6. The reason for providing the vibration absorbing device on the longer drive shaft is derived from the fact that more vibrations tend to occur in a longer shaft.

Figure 2:
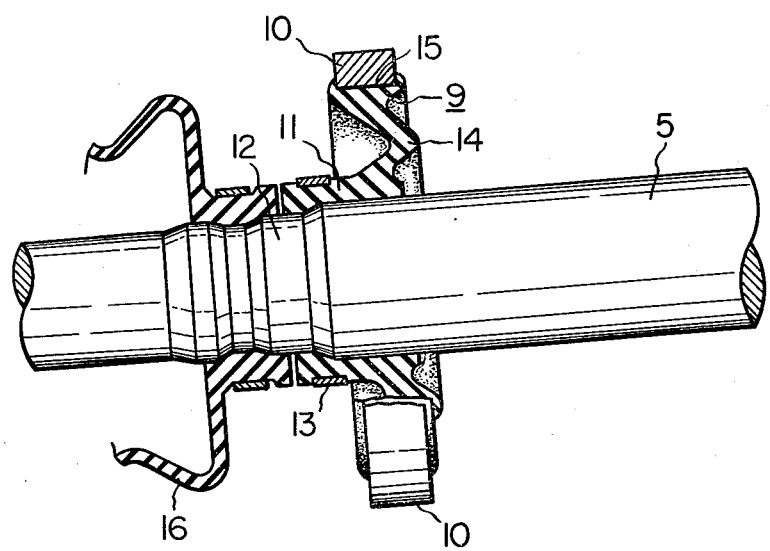
FIG. 2 is an enlarged longitudinal cross-sectional view of one embodiment of the vibration absorbing means.

As shown in FIG. 2, the above-mentioned vibration absorbing device includes a circular disc 9 made of a rubber material which is mounted and fixed around the outer peripheral surface of the drive shaft 5 and a ring-shaped weight 10 fixedly secured to the outer peripheral surface of the circular rubber disc 9. This circular disc 9 has a boss 11 in its center part. The boss 11 is fitted to the drive shaft 5 and secured to its staged part 12 by means of a tightening belt 13. The circular disc 9 has further a cushioning member 14 in continuity to the boss 12, and a ring-shaped groove 15 in its outer peripheral surface. The ring-shaped weight 10 is firmly adhered to, and held in, the ring-shaped groove 15. The manner, in which the weight 10 is fitted to the circular disc 9, is arbitrary. In one example, the weight 10 may be integrally joined with the circular disc 9 at the time of its forming under vulcanization.

Figure 3:
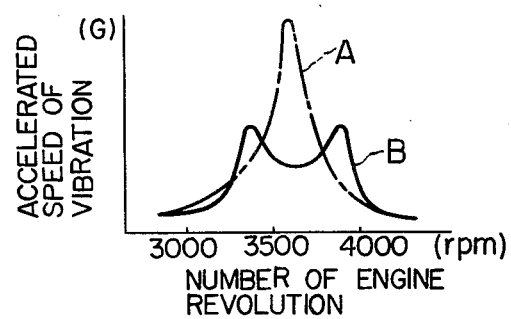
FIG. 3 is a graphical representation showing the results of measurement of vibrations.

With such construction as mentioned above, when vibrations which occur in the engine and any other relevant parts propagate through the drive shaft 5, there is created a so-called "dynamic damper" by the weight 10 and the cushioning part 11 of the circular disc 9 with the result that the vibrations are attenuated by this dynamic damper as shown by a curve B in FIG. 3 in comparison with another curve A which represents a construction having no damper of this kind. In this consequence, propagation of the vibrations from the drive shaft to the vehicle cabin can be prevented, and the occupants in the cabin can be relieved from disagreeable and dismal sound of vibrations transmitted through the drive shaft.

At the time of fitting the rubber-made circular disc 9, a staged part for mounting a boot 16 of a joint portion which is formed on the peripheral surface at the end part of the drive shaft can be utilized, hence the working cost can be reduced, and the workability in the fitting is satisfactory.

Figure 4:
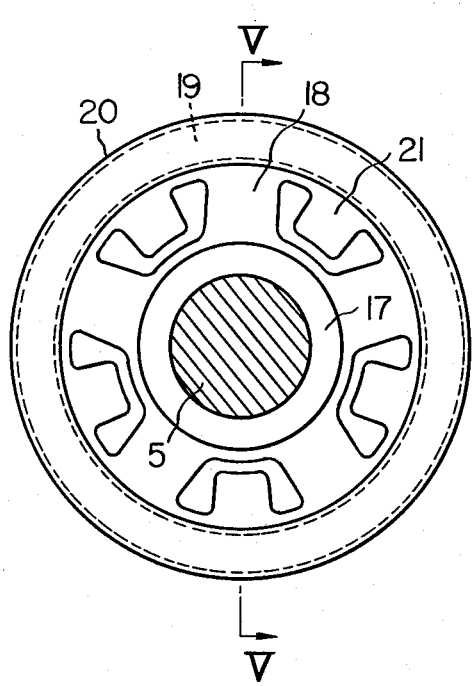
FIG. 4 is a plan view of a modified embodiment of the vibration absorbing means.
Figure 5:
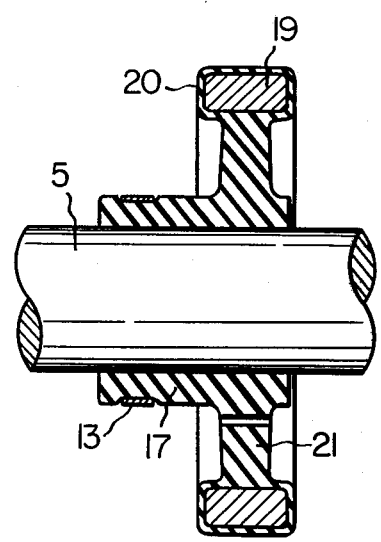
FIG. 5 is a cross-sectional view taken along the line V—V in FIG. 4.
Figure 6:
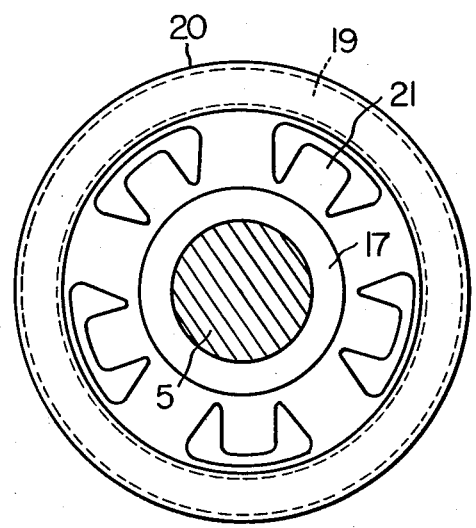
FIG. 6 is a plan view of still another embodiment of the vibration absorbing means.

FIGS. 4 and 5 illustrate a modified embodiment of the vibration absorbing means according to the present invention. This vibration absorbing means in constructed with a boss section 17 to be fitted and secured to the outer peripheral surface of the drive shaft 5, a plurality of cushioning pieces 18 extending radially from the boss section 17, a ring-shaped weight section 20 which connects the tip end part of each of the cushioning pieces 18, and in which the ring-shaped weight 19 is embedded, and a plurality of stopers 21 to restrict the amount of elongation and contraction of the cushioning pieces 18, the stoppers projecting inwardly from the inner peripheral surface of the ring-shaped weight section 20 at positions between the abovementioned adjacent cushioning pieces 18. Each of the abovementioned members are integrally formed with rubber. The illustrated embodiment shows that each of the stoppers 21 is formed of a rubber material, although it may be cast integrally with the ring-shaped weight 19. In this latter case, the surface of each stopper 21 is covered with coating of a rubber material. Also, as shown in FIG. 6, the stoppers 21 may be provided in the radial direction by arranging them to project outwardly from the boss section 17.

It is preferable that the abovementioned cushioning pieces 18 be provided in odd numbers such as, for example, three or five pieces. The reason for this is that, in so doing, stability can be imparted to the vibrations of the weight 19 in both axial and vertical directions of the shaft 5, and that, at the same time, distortion in the weight may be prevented.

The cushioning pieces 18 are required to have a considerable mechanical strength. For this purpose, if a spring constant is set at a high value, the weight 18 should be made heavier. It is in no way preferred to attempt that the weight be made larger in size and heavier in weight within a limited space. In regard to this problem, since the abovementioned stopper 21 governs the amount of expansion and contraction of the cushioning pieces 18, sufficient durability can be obtained, even if the spring constant of the cushioning pieces 18 is made low, so that the weight 19 can fulfil the intended purpose in its small size and light weight.

Further, when the stopper 21 is provided in the direction projecting inwardly from the weight 19 toward the boss 17, the weight of the stopper 21 is added to that of the weight 19 with the consequence that the weight 19 can advantageously reduce its weight.

Incidentally, it is to be noted that the device of the present invention can be applied to the vehicle of a type, in which the left and right drive shafts are equal in length. In this case, vibration absorbing means are provided in both left and right drive shaft.

What is claimed is:

1. A vibration absorbing and attenuating device for drive shafts in a motor vehicle, wherein driving force from an engine is transmitted to both left and right drive shafts through a clutch, a power transmission mechanism, and differential gears, which comprises in combination:
   (a) a circular disc made of a resilient material having a boss at the center part thereof to be fitted and secured around the outer peripheral surface of said drive shaft;
   (b) said circular disc including a plurality of radially expandable and contactible cushioning members, integral with said boss, extending radially from said boss;
   (c) a ring-shaped weight surrounding said circular disc and connecting the tip ends of said plurality of cushioning members, said weight being embedded in an annular groove formed in the outer peripheral surface of said resilient circular disc as an integral whole therewith; and
   (d) a plurality of stoppers projectively positioned between said adjacent cushioning members to restrict expansion and contraction of said cushioning members.

2. The vibration absorbing and attenuating device as set forth in claim 1, in which said stoppers project inwardly from the inwardly from the inner peripheral surface of said ring-shaped weight toward said boss.

3. The vibration absorbing and attenuating device as set forth in claim 1, in which said stoppers project outwardly from the outer perpheral surface of said boss toward the ring-shaped weight.

4. The vibration absorbing and attenuating device as set forth in claim 1, in which said device is provided at least at one of said drive shafts to the end part where wheel is fitted.

5. The vibration absorbing and attenuating device as set forth in claim 4, in which said device is provided at one of said left and right drive shafts having a longer length than the other.

6. The vibration absorbing and attenuating device as set forth in claim 1, in which said plurality of cushioning members are in odd numbers.

7. The vibration absorbing and attenuating device as set forth in claim 6, in which said plurality of cushioning members are five in number.

8. A vibration absorbing and attenuating device for drive shafts in a motor vehicle having an engine, right and left drive shafts connected mediately to said engine to be driven thereby and right and left wheels operatively coupled to the other ends of said right and left drive shafts respectively, wherein drive force from said engine is transmitted to both right and left drive shafts, thence to said right and left wheels, comprising:
   (a) a circular disc made of a resilient material having a boss at the center part thereof fitted and secured around the outer periphery of one of said drive shafts at the end thereof that is coupled to said wheel;
   (b) a plurality of radially expandable and contractible cushioning members radially extending from and integral with said boss;
   (c) a ring-shaped weight secured to the periphery of said resilient circular disc to surround said circular disc and join with tip ends of said plurality of radially extended cushioning members; and
   (d) a plurality of stoppers which project inwardly from the inner peripheral surface of said ring-shaped weight toward said boss, each stopper being projectively positioned between said adjacent cushioning members to restrict expansion and contraction of said cushioning members.

9. The vibration absorbing and attenuating device as set forth in claim 8, wherein one of said drive shafts is longer than the other and said device is fitted on said longer drive shaft.

10. The vibration absorbing and attenuating device as set forth in claim 8, wherein the number of said cushioning members is odd.

11. The vibration absorbing and attenuating device as set forth in claim 10, wherein said cushioning members are five in number.

12. A vibration absorbing and attenuating device for drive shafts in a motor vehicle having an engine, right and left drive shafts mediately connected to said engine to be driven thereby and right and left wheels operatively coupled to the other ends of said right and left drive shafts respectively, wherein drive force from said engine is transmitted to both right and left drive shafts, thence to said right and left wheels, comprising:
 (a) a circular disc made of a resilient material having a boss at the center part thereof fitted and secured around the outer periphery of one of said drive shafts at the end thereof that is coupled to said wheel;
 (b) a plurality of radially expandable and contractible cushioning members extending radially from and integral with said boss; and
 (c) a ring-shaped weight secured to the periphery of said resilient circular disc.

13. The vibration absorbing and attenuating device as set forth in claim 12, including a plurality of stoppers projecting radially and positioned projectively between adjacent cushioning members to restrict expansion and contraction of said cushioning members.

* * * * *